April 3, 1928.  1,664,839

H. H. WERMINE

FLUIDITY CONTROL SYSTEM

Original Filed Oct. 22, 1924  5 Sheets-Sheet 1

Inventor:
Hugo H. Wermine,
By Fisher Towle Clapp & Soans
Attys.

April 3, 1928. 1,664,839

H. H. WERMINE
FLUIDITY CONTROL SYSTEM
Original Filed Oct. 22, 1924 5 Sheets-Sheet 2

Inventor:
Hugo H. Wermine,
By Fisher Towle Clapp & Soans
Attys.

April 3, 1928.  H. H. WERMINE  1,664,839
FLUIDITY CONTROL SYSTEM
Original Filed Oct. 22, 1924    5 Sheets-Sheet 3
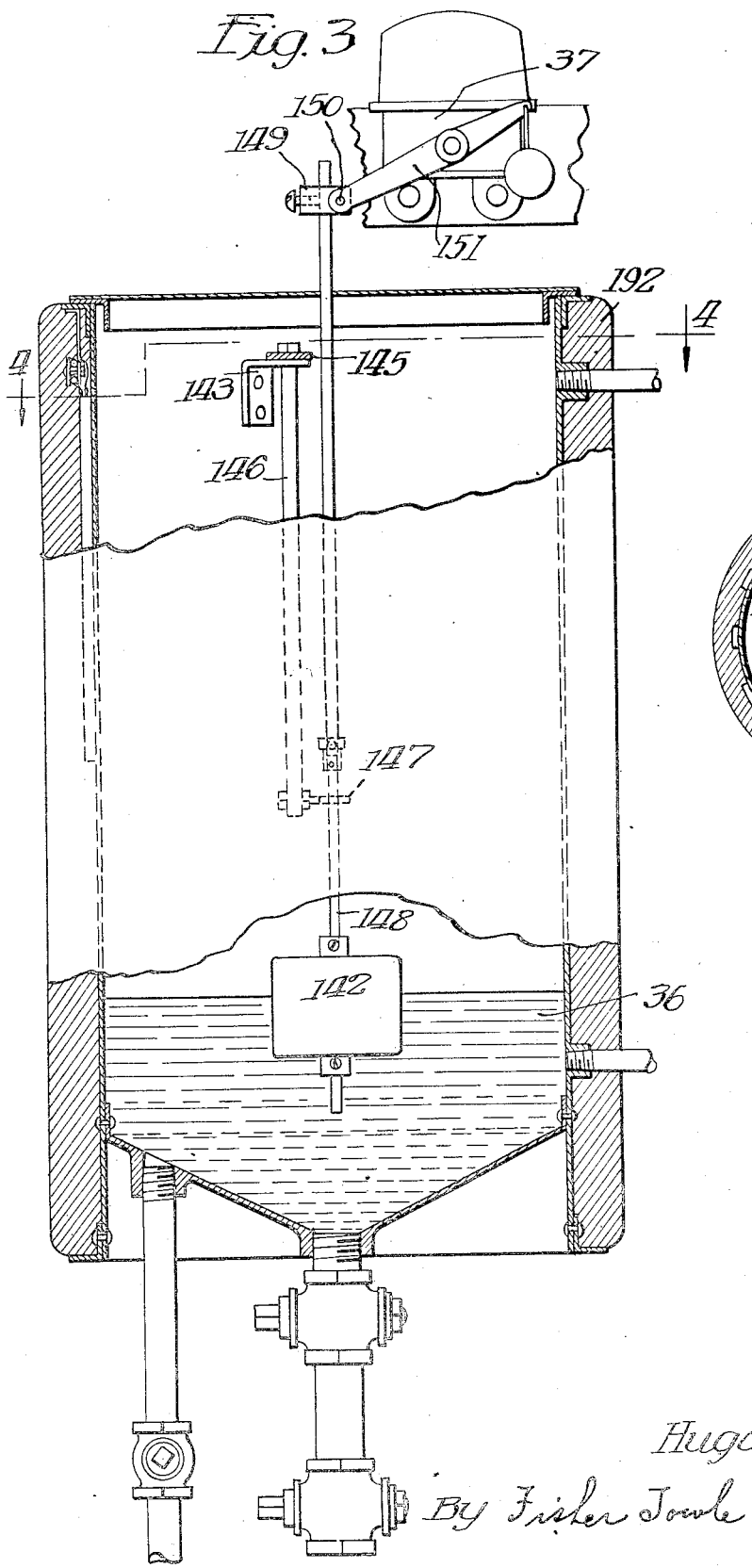
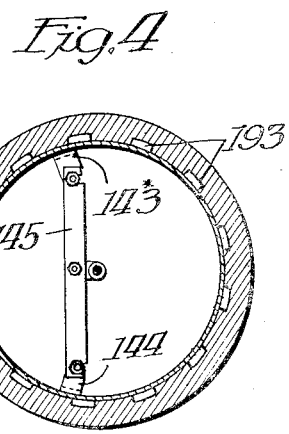
Inventor:
Hugo H. Wermine,
By Fisher Towle Clapp & Soans
Attys.

April 3, 1928. 1,664,839

H. H. WERMINE
FLUIDITY CONTROL SYSTEM
Original Filed Oct. 22, 1924   5 Sheets-Sheet 4

Inventor.
Hugo H. Wermine,
By Fisher Towle Clapp & Soans
Attys.

April 3, 1928.
H. H. WERMINE
FLUIDITY CONTROL SYSTEM
Original Filed Oct. 22, 1924    5 Sheets-Sheet 5
1,664,839
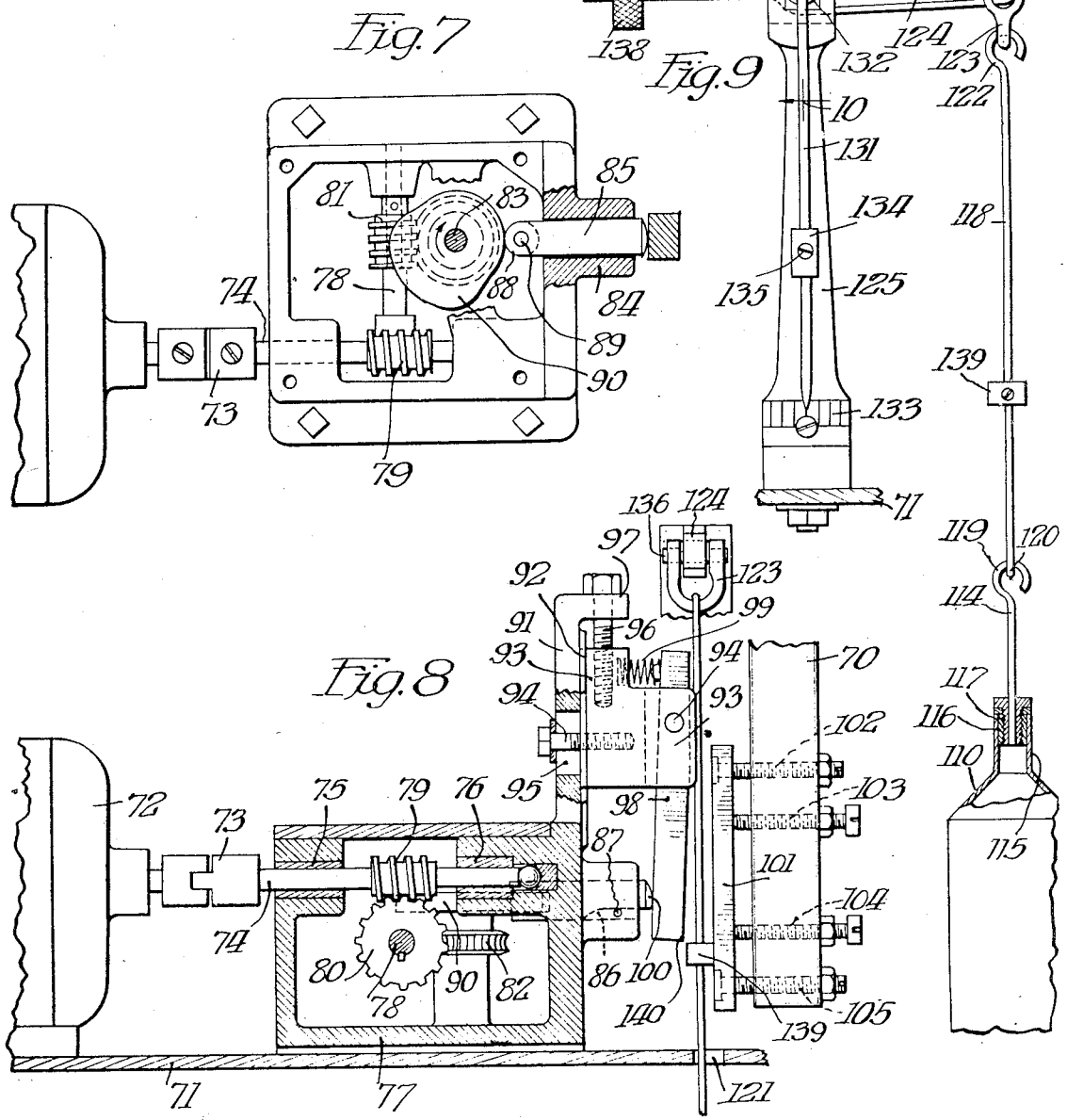
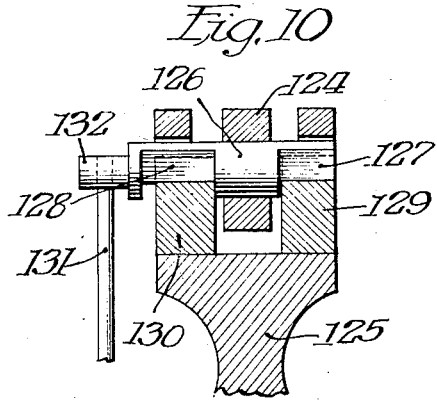
Inventor:
Hugo H. Wermine
By Fisher Towle Clapp & Soans
Attys.

Patented Apr. 3, 1928.

1,664,833

UNITED STATES PATENT OFFICE.

HUGO H. WERMINE, OF VILLA PARK, ILLINOIS, ASSIGNOR TO BELDEN MANUFACTURING COMPANY, OF CHICAGO, ILLINOIS, A CORPORATION OF ILLINOIS.

FLUIDITY-CONTROL SYSTEM.

Application filed October 22, 1924, Serial No. 745,190. Renewed February 23, 1928.

My invention relates to improvements in fluidity control systems. It is of particular value in connection with the controlling or standardizing of the fluidity of liquids, the fluidity of which depends upon the viscosity or density, which in turn is affected by the percentage or proportion of solvent or thinning liquid therein contained.

The invention may be used with great profit in connection with the regulation of the fluidity of liquids such as japan, enamel, varnish, lacquers, etc., employed for coating various articles.

Most coating liquids, particularly those of the lacquer or varnish types are thinned or brought to the proper degree of fluidity by the addition of a solvent or thinning liquid, which usually is of a considerably lighter density than the density of the coating liquid which is to be thinned. In many such coating liquids, the proper flowing effect and thickness of coating may be determined from the density of the liquid, due regard of course, being had for the purpose for which the coating liquid is to be used, the article to be coated, the manner of applying the coating, the kind of coating liquid, the kind of thinner used, and other factors, for example; temperature of the coating liquid, of the article to which it is applied, and of the atmosphere in which the application is effected.

Thus, other things being equal, if the density of the solution or coating liquid is maintained or standardized at a given figure, uniform coating results will be secured.

The principal objects of the invention therefore, are to provide a control system for automatically stabilizing the fluidity of a liquid at a standardized degree; to control automatically the density of a liquid containing a thinner or carrier of density differing from that of the liquid which is being controlled; to provide improved apparatus for affecting the aforesaid objects, and in general to provide an improved and efficient system of the character referred to.

In the drawings which show my invention as applied to the automatic control or regulation of the density of a coating liquid which contains a solvent or thinner of less density than that of the coating liquid itself, Fig. 1 is in diagrammatic form an elevation of the complete apparatus and connections.

Fig. 3 is an elevation, partly in section, of the circulating liquid reservoir and associated parts.

Fig. 4 is a section taken on the line 4—4 of Fig. 3.

Fig. 7 is a plan view of a portion of the mechanism shown in Fig. 2.

Fig. 8 is an elevation, partly in section, of a portion of said mechanism shown in Fig. 2.

Fig. 9 is a fragmentary enlargement of a portion of Fig. 2, and

Fig. 10 is a section taken on the line 10—10 of Fig. 9.

Figure 1:
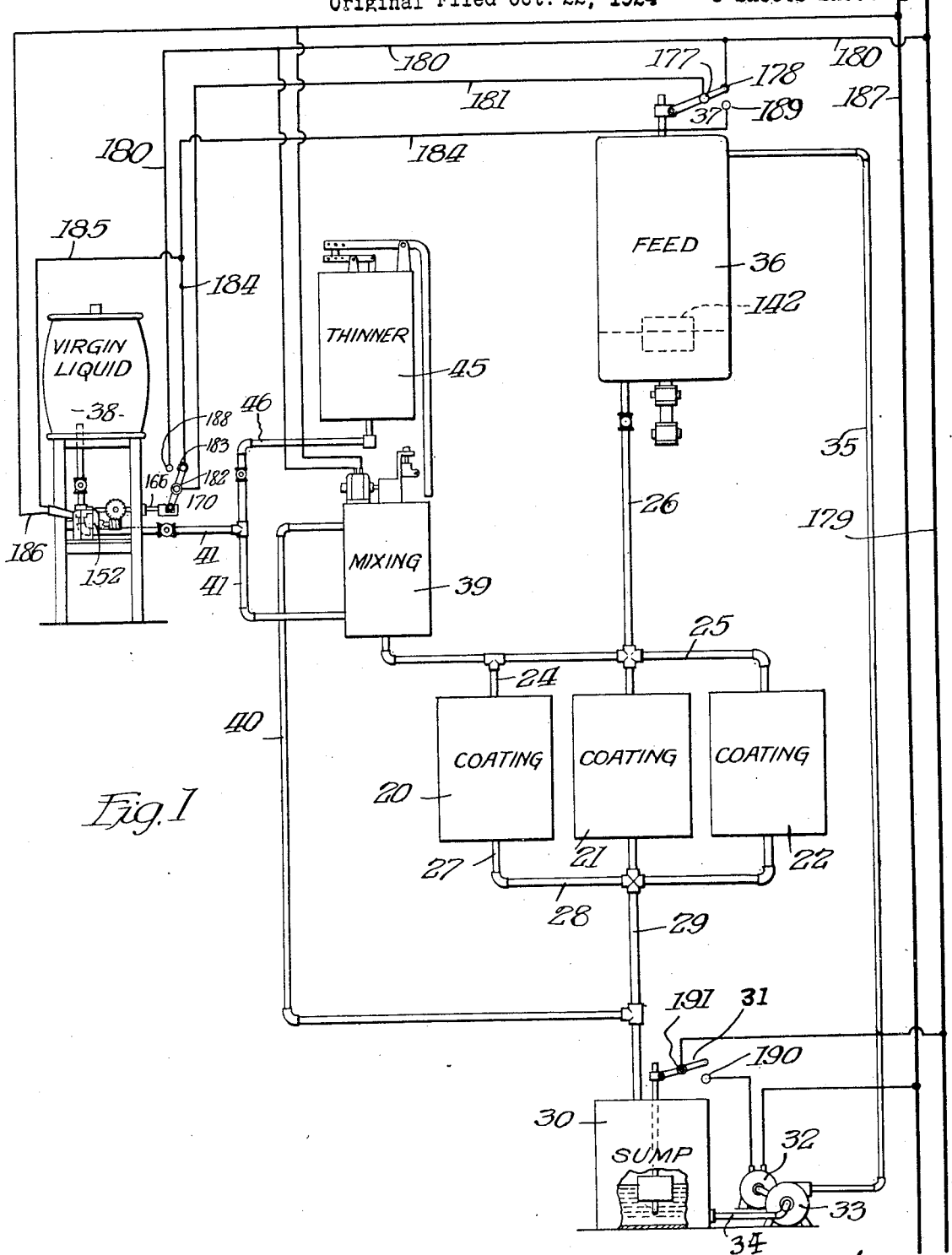

Referring to the drawings, 20, 21 and 22 represent diagrammatically the baths or other apparatus by which the coating of the articles treated is effected; the coating liquid in the present instance flowing by gravity through the apparatus. As shown in Fig. 1, the coating liquid flows into the several pieces of coating apparatus by means of inlet ducts as 24, which are connected to a transverse main 25, receiving the coating liquid from a feed line 26. After passing through the coating apparatus, the coating liquid passes through branch pipes as at 27, into a transverse main 28, which is connected to a discharge duct 29, leading directly into the sump tank 30.

In order to maintain proper circulation of the liquid through the coating apparatus, the sump tank 30 is provided with a float controlled switch indicated somewhat diagrammatically at 31 which intermittently operates a motor 32 driving an elevating pump 33 connected to a point adjacent the bottom of the sump tank by means of an intake pipe 34. The pump 33 when operated by the motor 32 forces the coating liquid up through a return pipe 35, discharging into the top of the feed tank or reservoir 36, to the bottom end of which the feed line 26 is connected.

Figure 2:
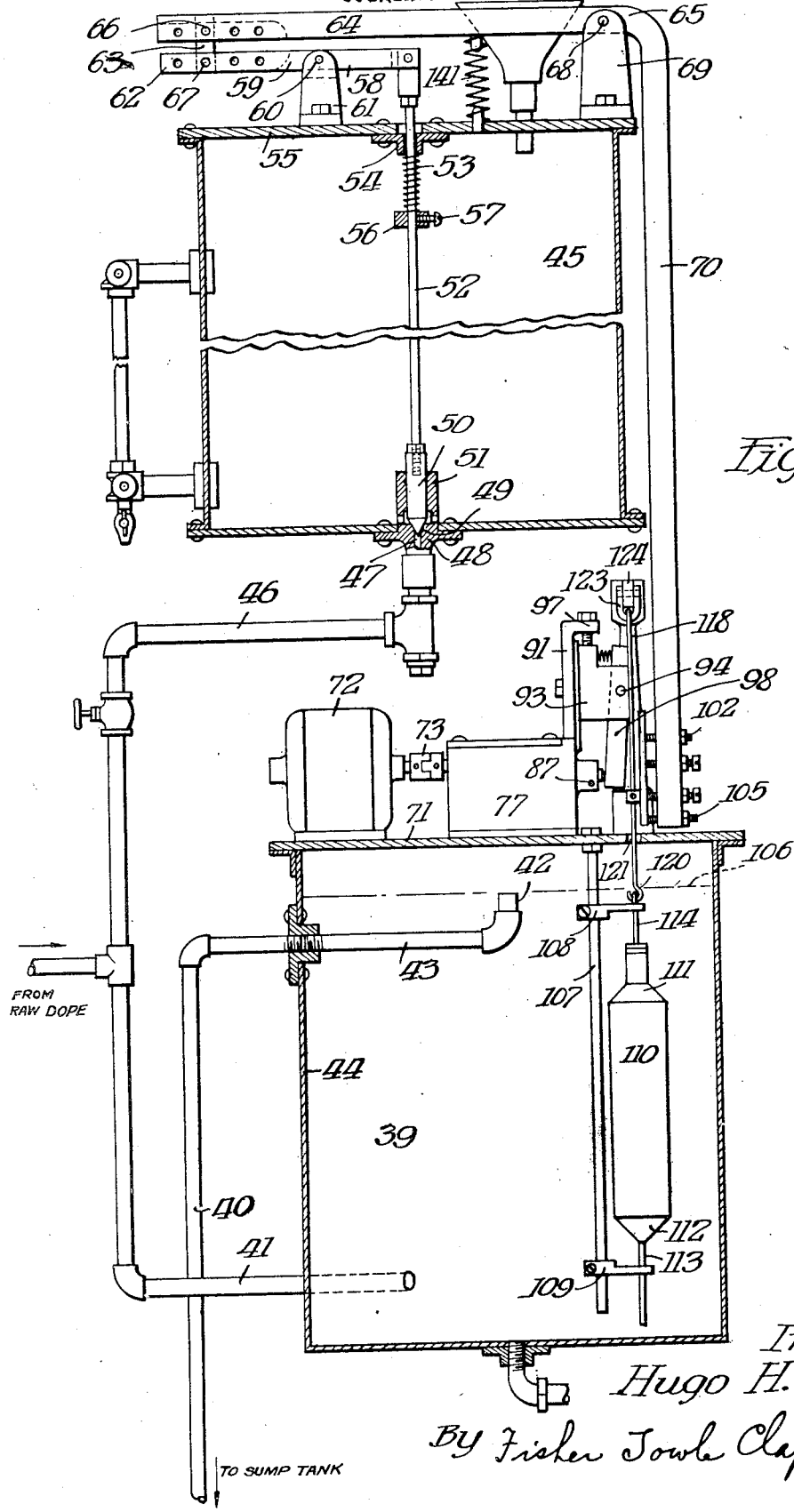
Fig. 2 is an elevation, partly in section, of the mixing tank, thinner supply tank and associated mechanism.

The feed tank 36 is equipped with a float controlled switch 37 similar to the float controlled switch 31, but having as shown in Fig. 1, a set of feed contacts which control a two-way circuit, and by means of mechanism which will later be described, serve to admit new or virgin coating liquid to the system from a supply tank 38, as the liquid in the circulating system is used up by the coating apparatus in treating the articles being coated. The virgin liquid from tank 38 preferably does not pass directly into the feed tank 36 or into the circulating system, but enters the same through the medium of a mixing tank 39, said mixing tank 39 being arranged to discharge into the sump tank 30 through a pipe 40. Preferably the virgin liquid is admitted to the mixing tank at the lower end thereof by a pipe 41 and the discharge of said mixing tank is preferably from adjacent the top through the open end 42 of the short vertical extension on the inner end 43 of the pipe 40, said portion 43 extending horizontally through the wall 44 of the mixing tank 39, as shown in Fig. 2.

The mixing tank 39 in effect constitutes a part of the circulating system as it is connected to the supply main 25, and hence at all times serves as a by-pass for a portion of the circulating liquid which flows downwardly through a feed line 26. Thus it serves as a sampling device, the standardizing apparatus operating upon said sample. The thinning liquid which is contained in the thinner tank 45, the outlet of which is controlled by the specific gravity mechanism discharges into the pipe 41 through a pipe 46. Said specific gravity mechanism will now be described.

The density mechanism.

Referring particularly to Figs. 2, and 7 to 10 inclusive, it will be seen that the outlet of the thinner tank 45 comprises an orifice 47 in the flanged outlet member 48, to which the discharge pipe 46 is suitably connected. The upper end of said orifice 47 is in the form of a valve seat 49 coned out to receive the lower correspondingly coned end of a valve plunger 50. Said plunger 50 is vertically movable in an extension 51 of the valve casing 48 and is operated by a vertically slidable rod 52. Normally said valve 50 is pressed down upon its seat 49 by means of a coiled compression spring 53 interposed between the flanged rod guide 54 secured to the top 55 of the tank and a collar 56, fixed to the rod 52 by a set screw 57. The valve rod 52 is somewhat loosely mounted in the guide 54 so as to permit a slight side movement of said rod and has its upper end pivotally connected to one arm 58 of an operating lever 59, said operating lever 59 extending substantially horizontally, and being journaled on a horizontally extending pin 60, fixed in the upper end of a bracket 61, mounted on the top 55 of the thinner tank. The outer end 62 of the operating lever 59 is actuated by a link 63 depending from the horizontally extending arm 64 of a bell-crank lever designated as a whole 65. The link 63 may be arranged in various different positions by shifting the link pivots 66 and 67 into different pairs of the holes spaced along the ends of arms 62 and 64. The bell-crank 65 is mounted to rock on an axially horizontal pivot 68 secured in the fork of a bracket 69, also secured to the top 55 of the thinner tank, and is provided with a substantially vertical depending arm 70, the lower end of which is operated by the density apparatus.

The density apparatus for actuating the bell-crank arm 70 is mounted on the mixing tank 39. On the top 71 of said tank, there is bolted an electric motor 72 which runs continuously, and is directly coupled by means of a flexible coupling 73 to the end of an axially horizontal shaft 74, mounted to rotate in spaced bearings 75 and 76 in the upper portion of a gear-case 77, also mounted on the top 71 of the mixing tank. There is also journaled in the gear-case 77, another horizontal shaft 78 below and at right angles to the shaft 74. Shaft 78 is driven at a reduced speed by means of a worm 79 keyed to the intermediate portion of shaft 74 which worm meshes with a worm-gear 80, keyed to shaft 78.

As shown best in Fig. 7, there is keyed to the transverse shaft 78 another worm 81 which meshes with a worm-gear 82, keyed to a vertical shaft 83 journaled in suitable bearings, formed as parts of the gear-case. Thus the shaft 83 will operate at a speed of a very few revolutions per minute.

Still referring to Figs. 7 and 8, it will be seen that on the side of the gear-case, remote from the motor, there is a boss 84, bored out horizontally and parallel with the motor axis to receive a sliding member or plunger 85. Said plunger is prevented from turning by milling off the lower side thereof as indicated at 86, said milled off surface cooperating with a fixed transverse horizontal pin 87. The inner end of the plunger 85 is equipped with a cam roll 88 carried on an axially vertical pin 89 fixed in the end of the plunger said cam roll 88 co-operating with a radial cam 90, keyed to shaft 83. Thus as the motor 72 constantly rotates the plunger 85 will be intermittently pushed in an outward direction by means of the slowly rotating cam 90.

Above the boss 84, there projects upwardly from the gear-case an integral bracket 91, one side of which is faced to provide a slideway 92. On said slideway 92 there is adjustably mounted a block 93, said block being secured in place by means of a clamping screw 94, extending through a vertically extending slot 95 in the bracket 91. Vertical movement of the block 93 is effected by the adjusting screw 96 which extends vertically through an aperture in a horizontal lug 97 on the upper end of bracket 91.

In the block 93, there is fixed an axially horizontal pivot pin 94' on which there is pivoted a rocking lever 98. The upper end of said rock lever 98 is normally pressed outwardly away from bracket 91 by means of a compression spring 99 interposed between the upper end of block 93, and the upper end of said lever 98 so that the lower end of said lever will at all times be pressed inwardly against the rounded outer end 100 of the slowly reciprocating plunger 85.

On the lower end of the vertical depending arm 70 of the bell-crank 65, there is mounted a vertically extending thrust-plate or abutment 101. Said plate 101 is adjustably spaced from the lower end of bell-crank arm 70, by means of a set of four adjustment screws 102, 103, 104 and 105, said plate being so adjusted that when the plunger 85 and lever 98 are at the outer limit of movement, the lower end of lever 98 will not quite contact with the abutment plate 101. Hence, the slow reciprocation of the plunger 85 by the constantly running motor 72, unaffected by outside agencies, will not actuate the bell-crank lever 65, and the solvent control valve 50 will remain closed.

Referring now to Figs. 2, 9 and 10, it will be observed that because of the overflow connection 42, the level of liquid in the mixing tank is maintained at a line marked 106. Extending vertically downward from the top of the tank there is mounted a fixed rod 107, carrying a pair of fixed guide arms 108 and 109, the outer ends of which are made with vertically aligned holes. Between the arms 108 and 109, and completely immersed in the liquid of the mixing tank, there is located a cylindrical float or immersion member 110, having considerable volume. Said float member 110 is coned at its upper and lower ends as shown at 111 and 112, so that it will move in a vertical direction somewhat freely through the liquid. The lower end of the float is provided with a vertical lower guide stem 113 which slides in the aperture of the lower guide arm 109, while the upper end of the float is fitted with an upper stem 114 which slides in the aperture in the upper guide arm 108.

As shown best in Fig. 9, the upper cone 110 of the float is made with a neck extension 115 fitted with a bushing 116 tapped to receive a threaded plug 117 in which the upper stem 114 is suitably secured. The plug 117 may be removed for the purpose of loading the float so that it will weigh somewhat more than the weight of the liquid which it displaces, and will thus tend to sink in the liquid. The float is prevented from sinking by virtue of its being suspended from a small rod or wire 118, connected to the stem 114 by hooks 119 and 120, said rod 118 extending upwardly through an enlarged aperture 121 in the top 71 of the mixing tank. The upper end of the suspension rod 118 is hooked as at 122 to enter the inverted U shaped suspension link 123 of a scale beam 124. Said scale beam 124 is carried at the upper end of a standard 125 bolted to the top or platform 71 of the mixing tank. As shown in Fig. 10 the pin 124 is fitted with a trunnion 126 which is axially horizontal and cut away at its opposite ends to form knife edges 127 and 128, said knife edges 127 and 128 rocking in aligned notches respectively formed in the blocks 129 and 130 secured to the top of the standard 125. A pointer 131 fixed in an extension 132 of the trunnion 126 and cooperating with a scale 133 on the face of the lower portion of the standard 125 serves to assist the operator in adjusting the mechanism. A weight 134, slidable along the pointer 131 and clamped thereon by a screw 135 may, if desired be employed for the purpose of stabilizing the beam.

As shown in Fig. 9, the scale beam 124 at one end carries knife edges 136 which support the U shaped suspension link or clevice 123, and the other end is made in the form of a screw 137 fitted with a counter-poise nut 138; said counter-poise nut 138 thus can be moved towards or away from the center of the beam in order to balance the pull on suspension rod 118, due to the weight of the float.

It will be manifest that when the density of the liquid in the mixing tank increases, due to evaporation of solvent, or other cause, the float will become more buoyant and the counter-poise nut 138 will thus elevate the rod 118 and associated parts. On the rod 118 there is secured a block 139 which normally occupies a position against the abutment plate 101, and slightly below the lower edge 140 of the rock lever 98. However, when the float rises, the block 139 will be elevated so that the upper edge of it will rise above the lower edge 140 of the rock lever 98. Thus, at its next outer reciprocation, due to the cam 90, the block 139 will be caught between rock lever 98 and abutment plate 101, resulting in an outward movement of the lower arm of the bell-crank 65 with a consequent opening of valve 50, and said valve will remain open so long as the enlargement of the cam 90 is in contact with cam roll 88. As the shaft 83 slowly rotates, the plunger 85 and rock arm 98 will return to the inner position under the influence of spring 99. The coiled compression spring 141, (see Fig. 2) interposed between the top 55 of the solvent tank and horizontal arm 64 of bell-crank 65 will close the valve 50, preventing further admission of solvent. If the quantity of solvent admitted to the mixing tank during the valve-opening portion of the revolution of shaft 83 has been sufficient to lower the density of the coating liquid in the mixing tank to the proper amount, the float 110, because of its reduced buoyancy, will descend and draw the block 139 downwardly below the edge 140 of rock lever 98, so that upon the next outward movement of the reciprocating plunger 85, the lever 98 will have nothing to operate upon, and the valve 50 will remain closed.

In connection with my improved system, it is of some advantage to maintain a substantially uniform quantity of coating liquid in the circulating system and to this end I provide automatic means for supplying such new or virgin coating liquid to the system. Such mechanism is controlled by a float 142 suspended in the feed tank 36. As shown in Figs. 3 and 4, said feed tank 36, is provided near its upper end with a pair of inwardly projecting lugs 143 and 144 which serve as supports for a transversely extending bar 145. Suspended from said bar 145 is an axially vertical rod 146, the lower end of which is fitted with a stud or bolt 147, the end of which is formed with an eye or an axially vertical aperture. The float 142 is secured to a central suspension rod or stem 148, arranged to slide through or be guided in the eye of said bolt 147. The upper end of said extension rod 148 extends through an aperture in the top of the feed tank 36, and is fitted with a block 149 pivotally connected at 150 to the outer end of an arm 151 of the Sundh switch 37. Said switch 37 preferably has a snap action so that its operation will be positive and not affected by slight movement of the float.

Figure 6:
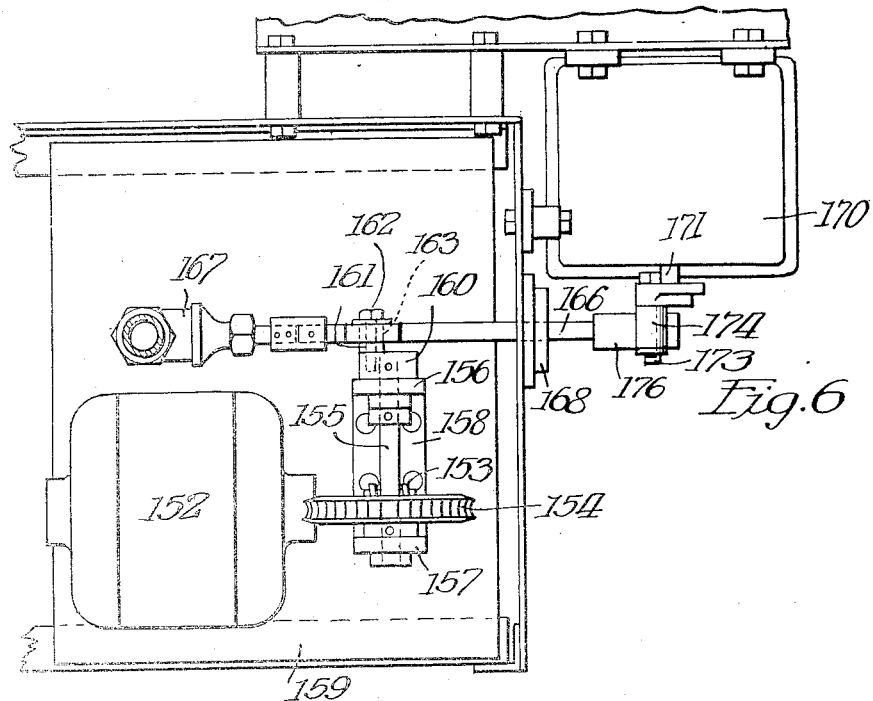
Fig. 6 is a plan view of the mechanism shown in Fig. 5.
Figure 5:
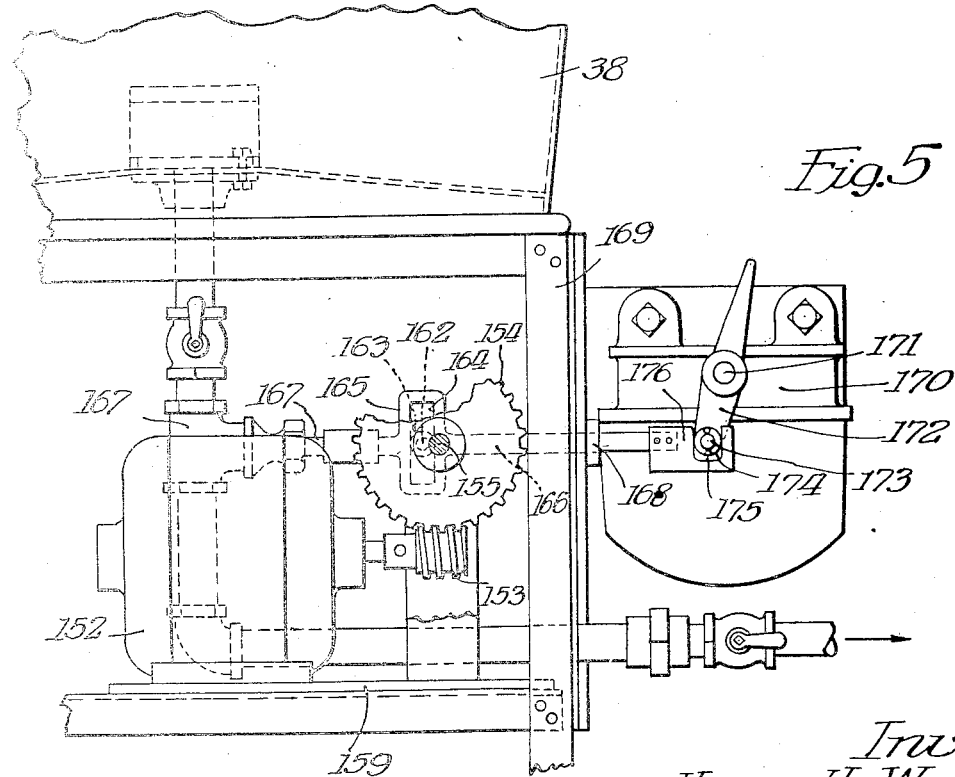
Fig. 5 is a fragmentary elevation of the storage tank for virgin coating liquid together with its associated mechanism.

Referring now to Figs. 5 and 6 under the virgin liquid tank 38 there is an electric motor 152. Said electric motor has on the end of its shaft, a worm 153 which meshes with a worm-gear 154, keyed to a horizontal shaft 155 mounted to rotate in bearings 156—157 formed as up-standing parts of bracket 158, bolted to platform 159. On the inner end of shaft 155 there is keyed a crank disc or collar 160, fitted with a crank pin 161. Said crank pin 161 has a reduced journal portion 162 fitting in a rectangular block 163 sliding in a rectangular slot 164 formed in a head 165. Said head 165 is formed as an integral part of a control shaft 166. One end of said control shaft is connected to the stem 167 of a gate valve, the housing of which is designated as 167. The other end of said controller 166 is in the form of a rod slidable in the fixed bearing 168. By means of the connections above described, the control shaft 166 is caused to reciprocate in a straight line when the motor 152 operates. To the virgin liquid tank support 169, there is secured a Sundh switch 170, the rock shaft 171 of said switch being actuated by the arm 172. On the end of said arm 172 there is a pivot 173 carrying a roller, which operates in a vertical slot 175 in the outer end of the block 176, pinned to the projecting outer end of said control rod 166.

As indicated diagrammatically in Fig. 1, the Sundh switches 170 and 37 are both of the three-way type, and control the circuit of the electric motor 152. In the position shown in Fig. 1, the control shaft 166 is shown in the position occupied when the gate valve 167, controlling the virgin liquid supply, is closed. The float 142 has just fallen and actuated the switch 37, closing the connection between contacts 177 and 178. This establishes a connection from one pole 179 of the power circuit, through wire 180, contacts 177—178, wire 181, contacts 182 and 183 of switch 170, wire 184 to one terminal wire 185 of the motor 152. As the other terminal wire 186 of said electric motor 152 is connected directly to the opposite pole 187 of the power circuit, the motor, hence, will commence to rotate. After said motor has operated a sufficient length of time to effect nearly half a revolution of the worm gear shaft 155, the crank 162 will have been moved outwardly carrying with it the control shaft 166. Such movement of the control shaft 166 will open the valve 167 permitting the virgin liquid to flow into the mixing tank through pipe 41, and it will also actuate the three-way Sundh switch through its arm 172. The operation of said switch will break the connection between 182 and 183, and will connect the contact 182 with the third contact 188, but since the wire 180 is not connected to the wire 185 through contacts 178 and 189, the circuit of the motor is broken and it will cease operating. Hence, valve 167 will be left in open position.

As the liquid from tank 38 runs into the mixing tank 39, and thence through pipe 40 into sump tank 30, the sump tank will tend to fill up rapidly and switch 31 will be operated to close the circuit between contacts 190 and 191. This will close the circuit of motor 32 which will operate the pump 33 and force the surplus liquid into the feed tank 36. As the level of liquid in feed tank 36 rises, the float 142 will also rise, finally resulting in the actuation of the Sundh switch 37. This will close the connection between contacts 177 and 189. Thus, the circuit of motor 152 will be completed through wire 180, contact 188, contact 182, wire 181, contact 177, contact 189 and wire 184. The motor 152 will then commence to rotate, but when it has operated a sufficient length of time to turn shaft 155 through another half revolution, thereby closing valve 167, it will have moved the rod 166 back in the position shown in Fig. 5, thereby actuating the switch 170. This breaks the circuit of motor 152 and leaves the parts in the position occupied with the virgin liquid valve closed.

In order to avoid certain difficulties due to changes in temperature, I may enclose the feed tank with a heat insulating jacket 192, and if desired said tank may be artificially heated by a series of electric resistance elements 193, of any convenient form, distributed around the tank on the inside of the jacket 192 and with thermostatic control if desired.

Since the described details of mechanism and operation are illustrative of only a single embodiment of my invention, it will be understood that the scope of same should be determined by reference to the appended claims, said claims being construed as broadly as possible, consistent with the state of the art.

I claim as my invention:

1. In a system for regulating the density of a solution, the combination of a buoy submerged in said solution of greater weight than the weight of the solution displaced by said buoy, balancing means for suspending said buoy in said liquid at a substantially definite height when the solution is of standard density, a valve for admitting fluid to said solution to change its density and means for actuating said valve controlled by the movement of said buoy into abnormal position, due to change in density of said solution, said last named means comprising a part intermittently movable into potentially operative position independently of said buoy but never effective to actuate said valve except as determined by the position of said buoy.

2. In a system for regulating the density of a solution, the combination of a buoy submerged in said solution, a valve for admitting low density thinner to said solution and means for actuating said valve controlled by the rise of said buoy into abnormal position, due to increase in density of said solution, said means comprising a constantly driven reciprocating part, a part connected to said valve, and a member movable by the buoy into position to connect said parts for effective operation.

3. In a system for regulating the density of a solution, the combination of a valve for admitting thinner from a source of supply to the solution, a part engaging said valve and adapted to open the valve when actuated, and means for actuating the part comprising a constantly driven member normally inoperative to actuate said part, and a buoy having means for enabling said driven member to actuate said valve part.

4. In a system for regulating the density of a solution, the combination of a source of supply for one of the elements used in the solution, means for feeding said element to the solution and means for controlling the feeding of the element from the source of supply to the solution, a constantly driven member and means governed by the density of the solution for causing said driven member to actuate said feed controlling means.

5. In a system for regulating the density of a solution, the combination of a constantly driven part, a source of supply for one of the elements of the solution and means for feeding the element to the solution, a valve for controlling the feed to the solution of the element, a lever for operating said valve, a buoy in the solution, and means controlled by said buoy for causing said driven part to actuate said lever to operate the valve.

HUGO H. WERMINE.